(12) United States Patent
Braun et al.

(10) Patent No.: US 7,394,915 B2
(45) Date of Patent: Jul. 1, 2008

(54) METHOD AND SYSTEM FOR MEASURING THICKNESS OF AN ITEM BASED ON IMAGING

(75) Inventors: John F Braun, Fairfield, CT (US); Robert A Cordery, Danbury, CT (US); Frederick W Ryan, Jr., Oxford, CT (US); Ronald P Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 376 days.

(21) Appl. No.: 11/228,598

(22) Filed: Sep. 16, 2005

(65) Prior Publication Data

US 2007/0062403 A1 Mar. 22, 2007

(51) Int. Cl.
*G06K 9/00* (2006.01)
(52) U.S. Cl. ........................................ 382/101; 382/286
(58) Field of Classification Search .................. 272/2, 272/262, 265.04; 382/101
See application file for complete search history.

(56) References Cited

U.S. PATENT DOCUMENTS

| | | | |
|---|---|---|---|
| 1,460,732 A * | 7/1923 | Pulfrich ........................ 356/319 |
| 4,271,477 A | 6/1981 | Williams |
| 4,653,399 A * | 3/1987 | Kuehfuss ...................... 101/485 |
| 4,929,843 A | 5/1990 | Chmielewski et al. |
| 5,013,927 A | 5/1991 | Tsikos et al. |
| 5,142,482 A | 8/1992 | Sansone et al. |
| 5,238,123 A | 8/1993 | Tovini et al. |
| 5,539,675 A | 7/1996 | Carroll et al. |
| 5,703,783 A | 12/1997 | Allen et al. |
| 5,727,692 A | 3/1998 | Large et al. |
| 5,930,734 A | 7/1999 | Hofmann et al. |
| 6,135,292 A | 10/2000 | Pettner |
| 6,586,930 B1 | 7/2003 | Kumar et al. |
| 6,655,683 B2 | 12/2003 | Engarto et al. |
| 6,795,200 B1 | 9/2004 | Barman et al. |
| 6,798,528 B1 | 9/2004 | Hartman |
| 6,832,213 B2 | 12/2004 | Freeman et al. |
| 2004/0066454 A1 * | 4/2004 | Otani et al. ................... 348/188 |
| 2005/0187887 A1 | 8/2005 | Nicolas et al. |

\* cited by examiner

*Primary Examiner*—Long Nguyen
*Assistant Examiner*—David H Banh
(74) *Attorney, Agent, or Firm*—Brian A. Lemm; Angelo N. Chaclas (57) ABSTRACT

A system and method for determining the thickness of a mail piece is provided. A first image of at least a portion of a surface of a mail piece is captured using a first optical axis for a feature on the surface of the mail piece. A second image of the feature is captured after the mail piece has moved a distance using a second optical axis that is angled with respect to the first optical axis. The first and second images are correlated to determine a displacement of the feature, and the thickness of the mail piece is determined based on the displacement and the angle between the first and second optical axes.

16 Claims, 6 Drawing Sheets

METHOD AND SYSTEM FOR MEASURING THICKNESS OF AN ITEM BASED ON IMAGING

BACKGROUND

This invention relates generally to the field of determining postal charges for mail pieces and more particularly to determining the thickness of mail pieces for dimension-based postal-rating schemes.

In the operation of many postal authorities, the postal charges assessed for carriage of mail pieces are based on the weight of the mail pieces. As used herein, mail pieces can include letters, postcards, flats, parcels or the like. However, alternative schemes have been proposed in which postal charges may also be based on dimensions of the mail pieces, including the thickness. To facilitate operation of such schemes, it has been proposed to automatically measure the thickness of mail pieces using sensors that contact the mail pieces. However, such mechanisms may prove to be inaccurate or unreliable, or may be prone to jamming as mail pieces are transported past the sensors.

SUMMARY

Accordingly, an improved apparatus and method for determining the thickness of a mail piece is provided. A method according to some embodiments includes capturing a first image of at least a portion of a surface of a mail piece, determining a first optical image for a feature from the first image, capturing a second image of the portion of the surface of the mail piece after the mail piece has been transported some distance, and determining a second optical image for the feature from the second image, the second optical image forming an angle with respect to the first optical image. The first image and the second image are then correlated to determine a displacement of the feature, and thickness of the mail piece can then be determined based on the displacement of the feature and the angle between the first and second optical axes.

The calculation of the thickness of the mailpiece may include convolving a first signal which represents the first image with a second signal which represents the second image. The images may include at least a portion of address information and/or a barcode on the mail piece.

In another aspect, an apparatus includes a deck for supporting a mailpiece, a camera positioned above the deck for capturing images of the mail piece, a lens positioned between the camera and the deck, a mechanism for transporting the mail piece along the deck, and a processor coupled to the camera for controlling the camera and processing the images. The processor may be operative to perform the method described above.

In another aspect, there is provided a method for a device used to determine the thickness of a mail piece to self-calibrate. The method includes capturing a first image of a first calibration mark using a first optical axis, and capturing a second image of a second calibration mark using a second optical axis that is angled relative to the first optical axis. The method also includes calculating an angle between the first and second optical axes by correlating the first and second images. In some embodiments the first and second calibration marks may be constituted by a single mark that is placed on a moving element of the device and moved from one location to another.

Therefore, it should now be apparent that the invention substantially achieves all the above aspects and advantages.

Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

In accordance with the present invention, two images are taken of a mail piece using different respective optical axes that are angled with respect to each other. The two images are correlated (e.g., by a convolution operation) and triangulation is employed to determine the distance from the camera to the top surface of the mailpiece. The height of the camera is known relative to the deck on which the mailpiece is supported, so that the thickness of the mail piece can be determined as the difference between the height of the camera and the distance from the camera to the top surface of the mail piece.

Figure 1:
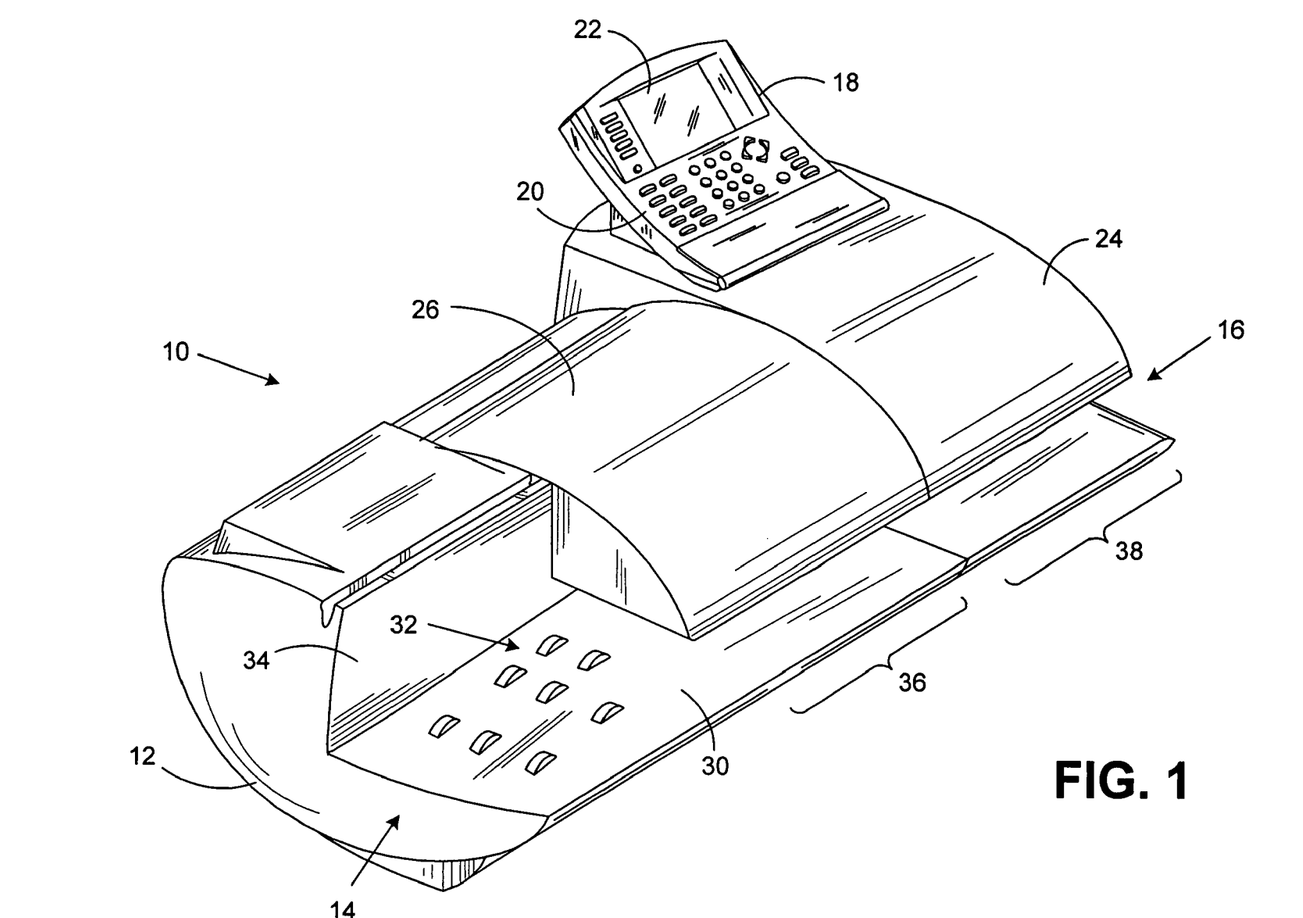
FIG. 1 is a perspective view of a mailing machine in which the present invention can be utilized.

Referring now to the drawings, and particularly to FIG. 1, the reference numeral 10 indicates generally a typical mailing machine in which the principles of the present invention can be incorporated. The mailing machine 10 includes a base unit generally designated by the reference numeral 12. The base unit 12 has a mail piece infeed end, generally designated by the reference numeral 14 and an mail piece outfeed end, designated generally by the reference numeral 16. A control unit 18 is mounted on the base unit 12, and includes one or more input/output devices, such as, for example, a keyboard 20 and a display device 22.

Cover members 24, 26 are pivotally mounted on the base 12 and are moveable between a closed position shown in FIG. 1 and an open position (not shown). In the open position of the cover members 24, 26, various operating components and parts are exposed for service and/or repair as needed. A mail piece transport mechanism which is not visible in FIG. 1 is housed under the cover members 24, 26. A module for determining the thickness of mail pieces in accordance with principles of the present invention as described below can be housed under the cover member 26.

The base unit 12 further includes a generally horizontal feed deck 30 which extends substantially from the infeed end 14 to the outfeed end 16. A plurality of nudger rollers 32 are suitably mounted under the feed deck 30 and project upwardly through openings in the feed deck so that the rollers 32 can exert a forward feeding force on a succession of mail pieces placed in the infeed end 14. A vertical wall 34 defines a mailpiece stacking location from which the mailpieces are fed by the nudger rollers 32 along the feed deck 30 and into the transport mechanism referred to above. The transport mechanism transports the mail pieces through one or more modules, such as a separator module, a moistening/sealing module and a thickness-determination module provided in accordance with principles of the invention. Each of these modules is located generally in the area indicated by reference numeral 36. The mail pieces are then passed to a metering/printing module located generally in the area indicated by reference numeral 38.

Figure 2:
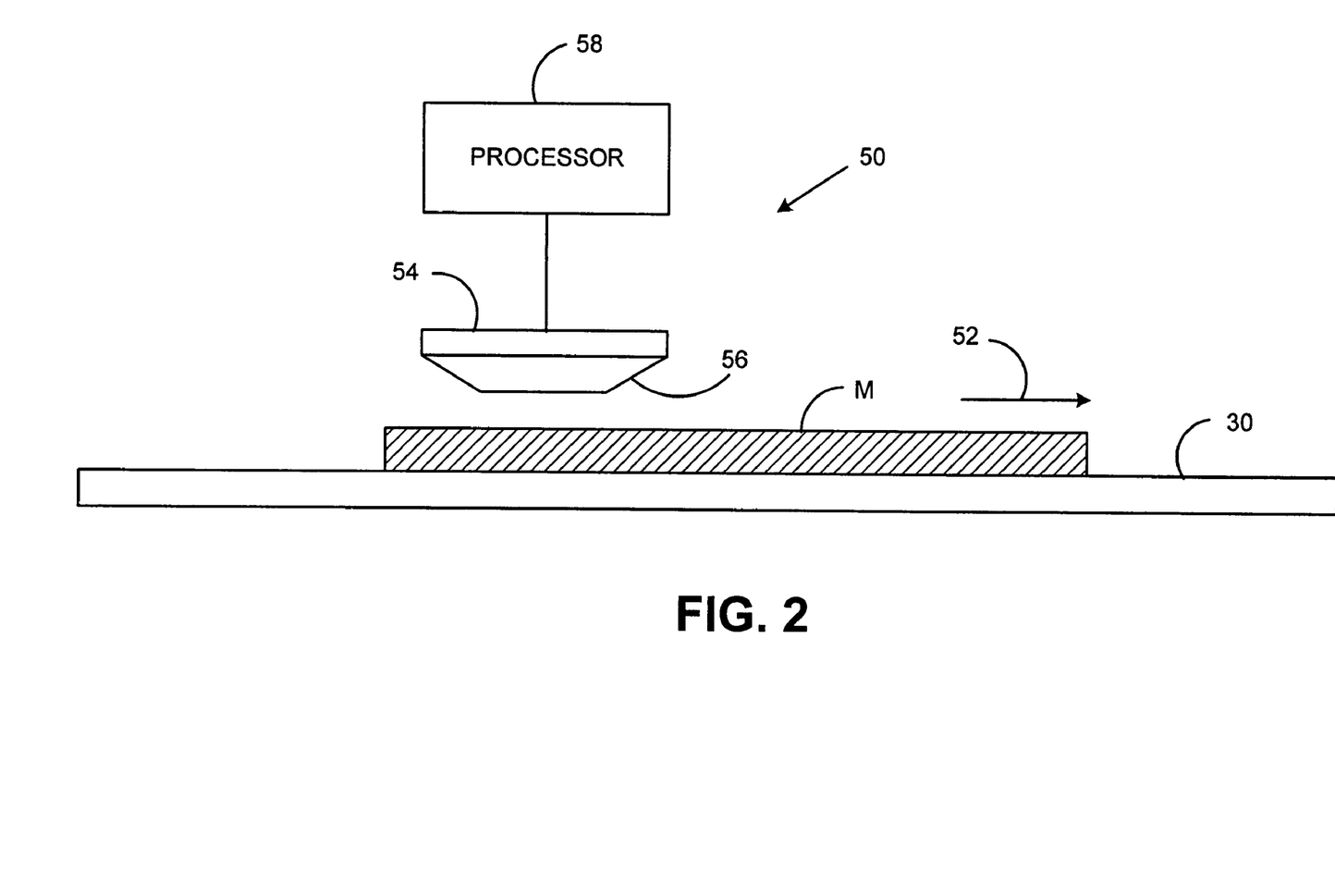
FIG. 2 is a schematic elevational view of a thickness-determination module that is part of the mailing machine of FIG. 1.

FIG. 2 is a schematic elevational view of a thickness-determination module 50 that is part of the mailing machine 10. The above-mentioned feed deck 30 supports a mailpiece M which is transported along the deck 30 and through the thickness-determination module 50 by a transport mechanism in the direction represented by arrow 52. The transport mechanism may operate in accordance with conventional principles, and may include one or more drive belts, idler or driving rollers, etc.

The thickness-determination module 50 also includes an electronic camera 54 (e.g., including a CCD device which is not separately shown) positioned above the deck 30 (or next to the deck 30 for transports that transport mail pieces in a vertical orientation) for capturing images of the mailpiece M. As will be seen, the images may include at least a portion of the top surface of the mailpiece M and may include at least a portion of printed address information and/or a barcode that is printed on the top surface of the mail piece. The images captured by the camera 54 for purposes of determining the thickness of mail pieces, and/or other images captured by the camera 54, may be used for other purposes, such as detecting address hygiene (correctness in content and/or format of address information printed on the mail piece M) and/or measuring the print quality of the information printed on the mail piece M.

The thickness-determination module 50 further includes a lens 56 positioned between the camera 54 and the deck 30. The lens may be configured to permit the camera to capture images using more than one optical axis. Thus the lens may be generally convex in its profile, although it may have, for example, some or all planar facets.

A processor 58 is coupled to the camera 54 to control the camera 54 and to analyze images captured by the camera 54. The processor 58 may functionally be included in the thickness-determination module 50 although the processor 58 may also perform other functions not directly related to determining the thickness of mail pieces, and may be located at some distance from the camera 54. For example, the processor 58 may be a component of the control unit 18 referred to above in connection with FIG. 1.

Although not shown in the drawing, the thickness-determination module 50 may also include a lamp or other source of illumination to allow the camera 54 to capture images of the mail piece M.

Figure 3A:
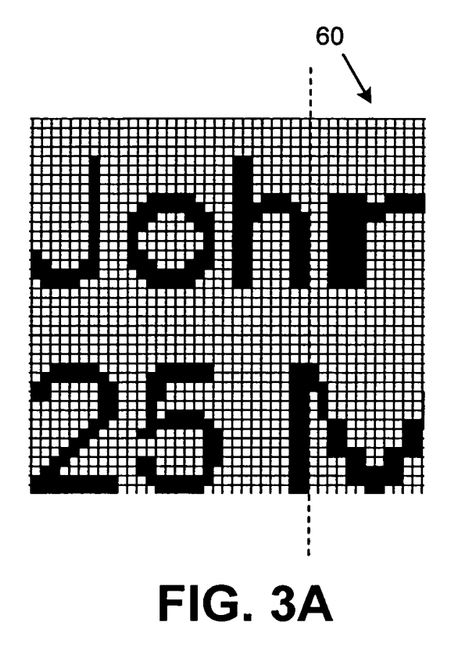
FIGS. 3(A) to 3(C) illustrate images captured by the thickness-determination module of FIG. 2.
Figure 3B:
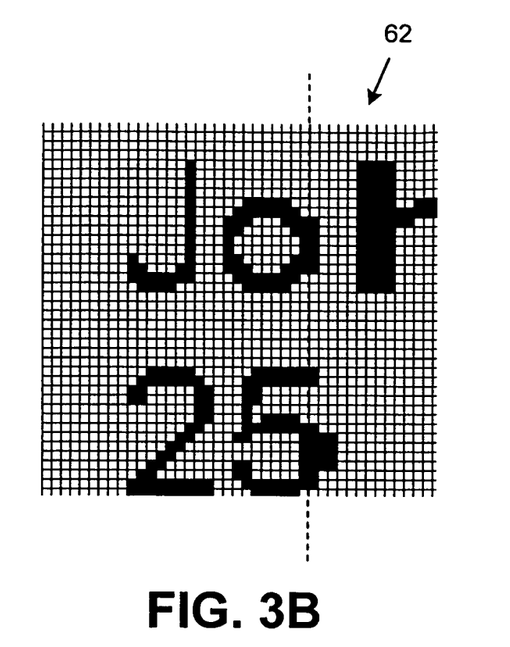
Figure 3C:
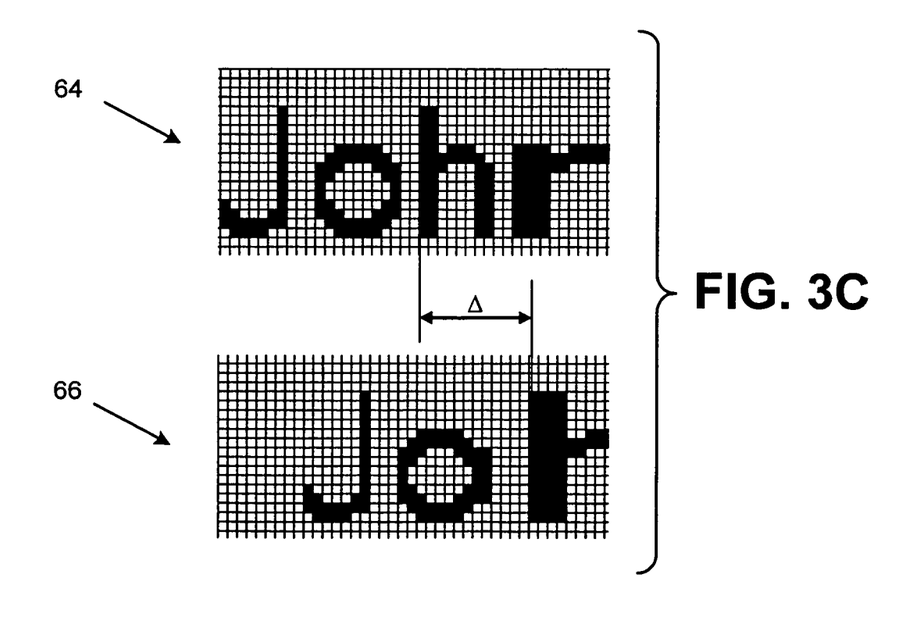

FIGS. 3(A) to 3(C) schematically illustrate images captured by the camera 54 of the thickness-determination module 50. The image schematically shown in FIG. 3(A) is captured at a first point in time and represents a portion of an address information field on the top surface of the mail piece M. The image schematically shown in FIG. 3(B) is captured at a second point in time that is later than the first point in time, and is captured after the mail piece M has been further transported along the deck 30. Both images shown in FIGS. 3(A) and 3(B) may be captured while the mail piece M is being transported along the deck 30 by the transport mechanism in the direction of arrow 52. As indicated at 60 in FIG. 3(A) and at 62 in FIG. 3(B), the right side of the images may be somewhat distorted due to characteristics of the portion of the lens 56 which correspond to the right side of the images. (For purposes of illustration, the degree of distortion is exaggerated).

FIG. 3(C) shows portions of the images of FIGS. 3(A) and 3(B) in juxtaposition to illustrate correlation of one of the images with the other. In this example, a feature (the first line in the letter "h") in image 64 (corresponding to FIG. 3(A)) is correlated with the corresponding feature in image 66 (which corresponds to FIG. 3(B)) to determine a displacement $\Delta$ between the two features. The displacement $\Delta$ may be initially determined utilizing pixels of the camera and thereafter translated into a standard measure of distance such as millimeters. The portion of the image 64 which contains the "h" may be considered an image captured using one optical axis, and the portion of the image 66 which contains the "h" may be considered another image captured with a second optical axis that is angled relative to the axis used to capture the "h" in image 64. In some embodiments, more than one feature in the images may be correlated with its corresponding feature in the other image to improve the accuracy of the correlation of the images.

Figure 4A:
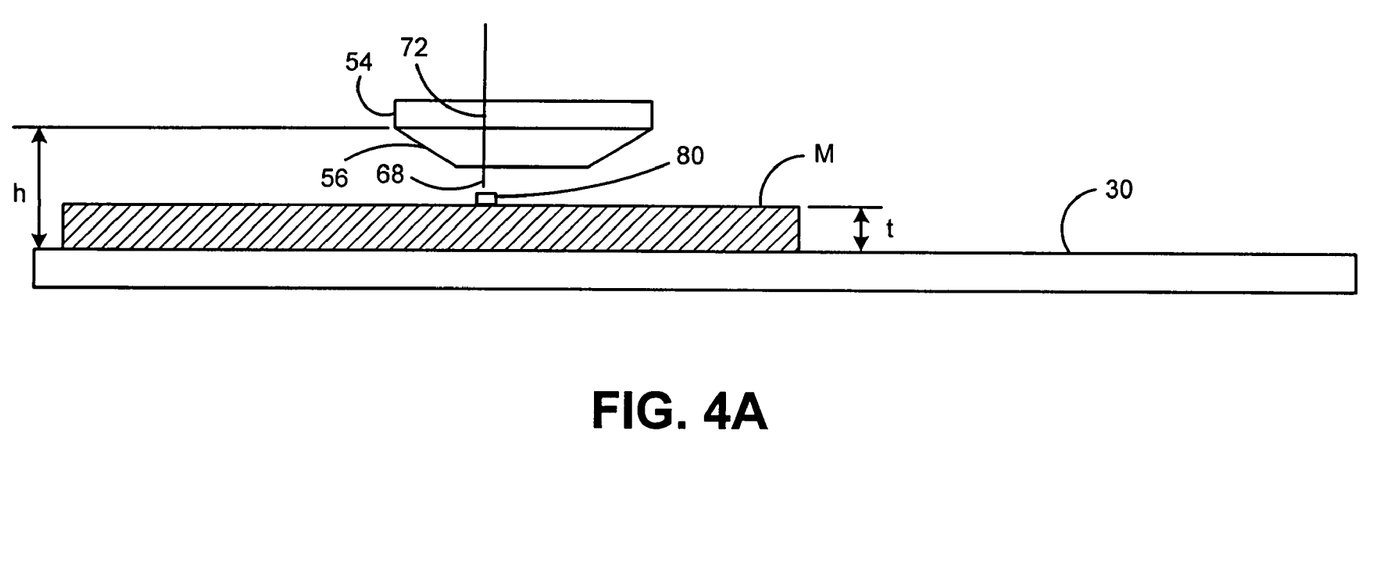
FIG. 4A is a view similar to FIG. 2 showing the position of a mail piece when a first image is captured.
Figure 4B:
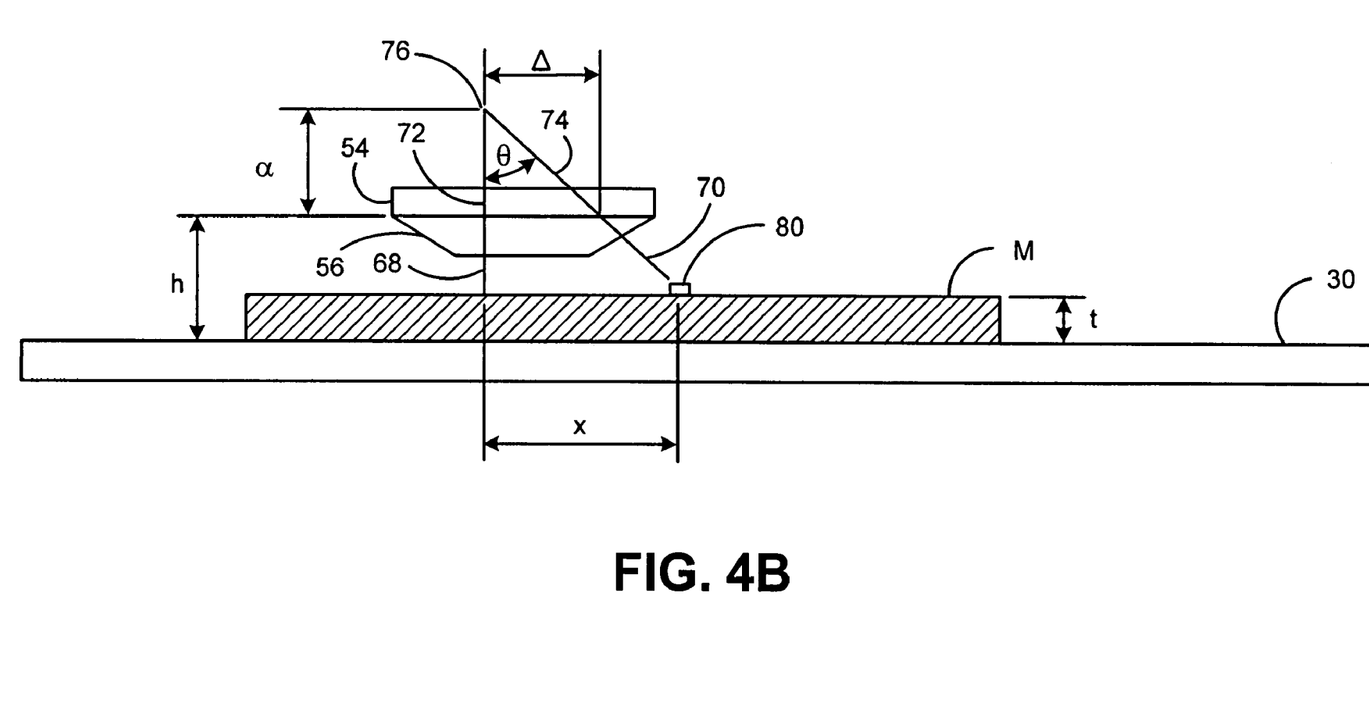
FIG. 4B is a view similar to FIG. 2 showing the position of a mail piece when a second image is captured.

FIGS. 4A and 4B are views similar to FIG. 2 but on a larger scale, illustrating different positions of a mail piece M when images are captured. FIG. 4A illustrates a mail piece M at a first location along the deck 30, while FIG. 4B illustrates the mail piece M at a second location after the mail piece has been transported in a downstream direction (to the right in the figures). In FIGS. 4A and 4B, the thickness t of the mail piece M is the unknown quantity to be determined. As illustrated in FIG. 4A, reference numeral 68 indicates a first optical axis used by camera 54 to capture a feature (identified by reference numeral 80) e.g., an alphabetic character, number or anything else, printed on the top surface of the mail piece M in a first image. Reference numeral 72 indicates a line constructed to extend the optical axis 68. As illustrated in FIG. 4B, reference numeral 70 indicates a second optical axis used to capture the same feature 80 in a second image at a later time, i.e., after the mail piece, and thus the feature 80, has been transported by a distance x along the deck 30. The distance x may be determined based on the elapsed time between capture of the two images, and the speed at which the transport mechanism transports the mail piece. Reference numeral 74 indicates a line constructed to extend the optical axis 70. Reference numeral 76 indicates a meeting point of lines 72, 74. The quantity $\theta$ represents the angle between lines 72, 74 and hence the angle between optical axes 68, 70. The angle $\theta$ may be determined in advance during set up or manufacture of the module 50. In some embodiments, if the lens 56 is curved rather than formed of planar facets, the angle $\theta$ may vary from pixel to pixel that coincides with the optical axis 70 (which pixel depends on the feature selected to perform correlation between the images). In any case, the values of $\theta$ may be determined in advance for each pixel. The height h is the distance from the deck 30 to the operative surface of the camera 54. The height h can also be determined in advance.

From two similar right triangles drawn from point 76 in FIG. 4B, the following equations can be obtained:

$$\tan \theta = \Delta/\alpha \quad \text{(Eq. 1)}$$

$$\tan \theta = x/(h-t+\alpha) \quad \text{(Eq. 2)}$$

Solving Equation 1 for $\alpha$ yields:

$$\alpha = \Delta/\tan \theta \quad \text{(Eq. 3)}$$

Solving Equation 2 for t yields:

$$t = h + \alpha - (x/\tan\theta) \quad \text{(Eq. 4)}$$

Substituting for $\alpha$ in Eq. 4 (from Eq. 3) and re-arranging results in the following:

$$t = h - ((x-\Delta)/\tan\theta) \quad \text{(Eq. 5)}$$

It will be noted that Equation 5 expresses the thickness t of the mail piece in terms of quantities that are either known in advance or can be obtained based on the timing of the capture of the two images and the correlation of the two images. In particular, the displacement $\Delta$ between the two images on the camera surface can be obtained by correlating features in the two images.

Figure 5:
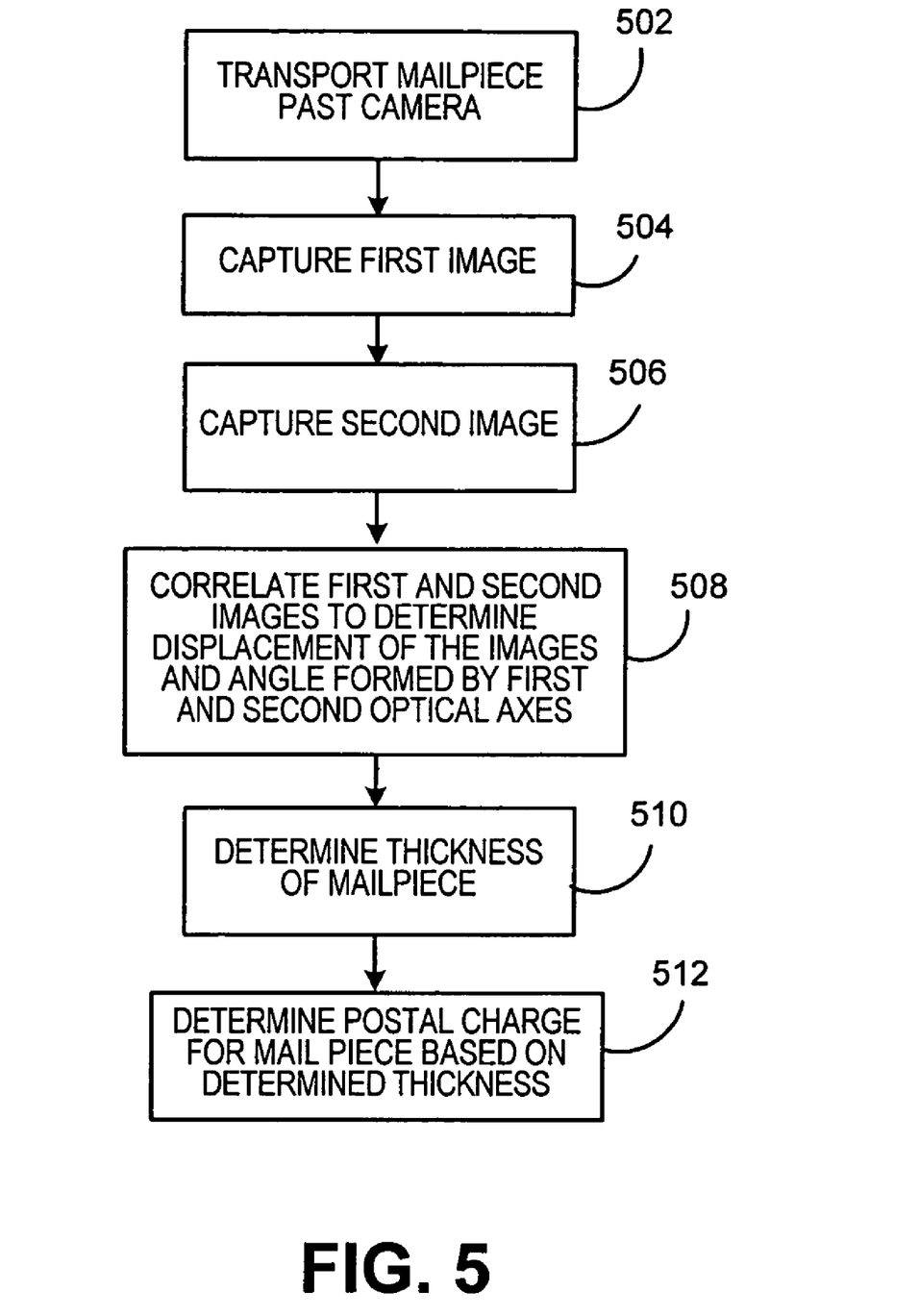
FIG. 5 is a flow chart which summarizes the thickness-determination process of the present invention.

FIG. 5 is a flowchart that summarizes a process that may be performed by the thickness-determination module 50 to determine the thickness of a mailpiece. At 502, the mail piece is transported past the camera 54 by the transport mechanism in the direction of arrow 52. At 504, a first image of a feature 80 on the top surface of the mail piece is captured along a first optical axis by the camera (as illustrated in FIG. 4A). At 506, a second image of that feature 80 is captured at a later time after the mail piece has been moved some distance by the transport mechanism along a second optical axis by the camera (as illustrated in FIG. 4B). At 508, using correlation of the two images (or of a feature 80 or features therein), the displacement $\Delta$ of the images relative to each other along the operative surface of the camera can be determined as well as the angle $\theta$ formed by the first and second optical axes. Then, at 510, the thickness of the mail piece can be determined by, for example, calculation in accordance with Equation 5. Alternatively, the thickness can be determined utilizing a look-up table having pre-calculated results for different variable values, e.g., displacement and angle $\theta$, used in Equation 5. In this manner, determination of the thickness can be performed without the module 50 having to perform any type of calculations.

Thereafter, at 512 the thickness of the mailpiece determined at 510 may be used as an input to determine a shipping charge for delivery of the mail piece by a carrier, and the resulting amount may be used to set the metering/printing module referred to above in connection with FIG. 1 to generate an indicium to evidence payment of the shipping charge.

In some embodiments, the thickness-determination module 50 may engage in a self-calibration procedure to determine the angle $\theta$ based on one or more calibration marks placed on the deck 30 under the camera 54 or on a drive belt or the like of the transport mechanism. In the first instance, it will be assumed that two calibration marks are placed on the deck 30 under the camera 54 and are spaced from each other a known distance $x_0$ in the direction of transport.

If t is set to zero in Equation 5, and the result is rearranged, the following equation is provided:

$$\tan\theta = (x_0 - \Delta)/h \quad \text{(Eq. 6)}$$

This in turn yields:

$$\theta = \tan^{-1}((x_0 - \Delta)/h) \quad \text{(Eq. 7)}$$

The displacement $\Delta$ can be determined by capturing a respective image of each of the calibration marks, and then correlating the two images by correlation of the calibration marks as they appear in the images. The angle $\theta$ can then be calculated using Equation 7, as all of the variables necessary will be known.

In other embodiments, a single calibration mark is placed on a drive belt (not shown) which is flush with the deck, and respective images of the calibration mark are taken before and after the calibration mark is moved a known (or calculated) distance $x_0$ along the deck. In these embodiments, the single calibration mark effectively is utilized as a first and second mark by being moved along the deck. Again the two images of the calibration mark are correlated to determine the displacement $\Delta$, and the angle $\theta$ can then be calculated using Equation 7.

In still other embodiments, if the angle $\theta$ is known but the height h is not, due to, for example, manufacturing tolerances or machine wear, a similar self-calibration procedure may be employed to determine the height h, using the following equation, which is a rearrangement of Equation 6:

$$h = (x_0 - \Delta)/\tan\theta \quad \text{(Eq. 8).}$$

In some embodiments, for both thickness determinations and/or self-calibration, the correlation of the two images may be performed with greater computational efficiency by convolving the two images and detecting a peak of the convolution function, where the peak indicates the displacement between the two images. Still further computational efficiency may be achieved by using phases of Fourier components of the images to determine the displacement between the two images.

If convolution is to be employed in correlating the two images, a set of differential image data for the first image may be obtained by subtracting the average pixel value from each pixel value for the first image. Similarly, with respect to the second image, a set of differential image data for the second image may be obtained by subtracting the average pixel value for the second image from each pixel value for the second image. A complex fast Fourier transform may be applied to each of the sets of differential image data and then the resulting transform elements for the first image can be multiplied element by element (i.e., each element is multiplied by the corresponding element in the other set of transform elements) by the complex conjugate of transform elements for the second image. An inverse complex fast Fourier transform is then applied to the product of the multiplication operation, and the resulting convolution data is normalized by being divided by the maximum value of the resulting convolution data. The index of the peak element (i.e., the element equal to 1) of the normalized convolution data identifies the degree of offset, in pixels, between the two images.

If Fourier phases are to be employed in correlating the two images, a set of differential image data for each image may be obtained in the same manner described in the previous paragraph. A respective complex fast Fourier transform is then applied to each of the resulting sets of differential image data to obtain a respective set of transform elements for each of the images. Define ARG as the complex argument of the ratio, taken element to element, of the two sets of transform elements. Pick two parameters r0 and r1 (e.g., r0=5 and r1=3), each corresponding to a respective row of the ratio array (where the two images are vertically displaced). The offset in rows (pixels) may then be calculated by the following formula:

$(ARG_{r0,0} - ARG_{r1,0}) * N_r / (2 * \pi * (r0 - r1))$, where $N_r$ is the number of rows in the image.

In some embodiments, a thickness-determination module such as one of those described above may be included in a device operated by a postal authority to confirm that mailers are affixing appropriate amounts of postage to mailpieces.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. In a mail processing system having a transport for transporting mail pieces along a deck and an imaging device for capturing images of mail pieces, a method for determining thickness of a mail piece comprising:
   capturing a first image of at least a portion of a surface of the mail piece using the imaging device, the first image having a first optical axis for a feature on the surface of the mail piece;
   capturing a second image of the at least a portion of the surface of the mail piece after the mail piece has been transported a distance along the deck, the second image having a second optical axis for the feature on the surface of the mail piece, the second optical axis forming an angle with respect to the first optical axis;
   correlating the first and second images to determine a displacement of the feature between the first and second images; and
   determining the thickness of the mail piece based on the displacement and the angle between the first and second optical axes.

2. The method according to claim 1, wherein determining the thickness further comprises:
   using a look-up table to determine the thickness based on the displacement and the angle between the first and second optical axes.

3. The method according to claim 1, wherein determining the thickness further comprises:
   calculating the thickness based on the displacement, the angle between the first and second optical axes, the distance along the deck the mail piece has been transported between capturing of the first and second images, and a distance between the imaging device and the deck.

4. The method according to claim 3, wherein calculating the thickness includes convolving a first signal which represents the first image with a second signal which represents the second image.

5. The method according to claim 1, wherein the mail piece is an envelope.

6. The method according to claim 1, wherein the feature includes at least a portion of address information on the mail piece.

7. The method according to claim 1, wherein the feature includes at least a portion of a barcode on said mail piece.

8. The method according to claim 1, further comprising:
   determining a shipping charge for the mail piece based on the determined thickness of the mail piece.

9. A mail processing system comprising:
   a deck for supporting a mail piece;
   means for transporting mail pieces along the deck;
   an imaging device for capturing images of mail pieces being transported along the deck; and
   a processor coupled to the imaging device for controlling the imaging device and processing the images captured by the imaging device, the processor being programmed to:
      capture a first image of at least a portion of a surface of a mail piece using the imaging device, the first image having a first optical axis for a feature on the surface of the mail piece;
      capture a second image of the at least a portion of the surface of the mail piece after the mail piece has been transported a distance along the deck, the second image having a second optical axis for the feature on the surface of the mail piece, the second optical axis forming an angle with respect to the first optical axis;
      correlate the first and second images to determine a displacement of the feature between the first and second images; and
      determine the thickness of the mail piece based on the displacement and the angle between the first and second optical axes.

10. The system according to claim 9, further comprising:
    a look-up table, wherein the processor determines the thickness using the look-up table based on the displacement and the angle between the first and second optical axes.

11. The system according to claim 9, wherein the processor determines the thickness by calculating the thickness based on the displacement, the angle between the first and second optical axes, the distance along the deck the mail piece has been transported between capturing of the first and second images, and a distance between the imaging device and the deck.

12. The system according to claim 11, wherein calculating the thickness includes convolving a first signal which represents the first image with a second signal which represents the second image.

13. The system according to claim 9, wherein the mail piece is an envelope.

14. The system according to claim 9, wherein the feature includes at least a portion of address information on the mail piece.

15. The system according to claim 9, wherein the feature includes at least a portion of a barcode on said mail piece.

16. The system according to claim 9, wherein the determined thickness is used to determine a shipping charge for the mail piece.

* * * * *